Feb. 18, 1930.　　　　J. LEROY　　　　1,747,253
STUFFING BOX
Filed June 16, 1921　　2 Sheets-Sheet 1

Inventor:
Jules Leroy
By Lawrence Langner
Atty.

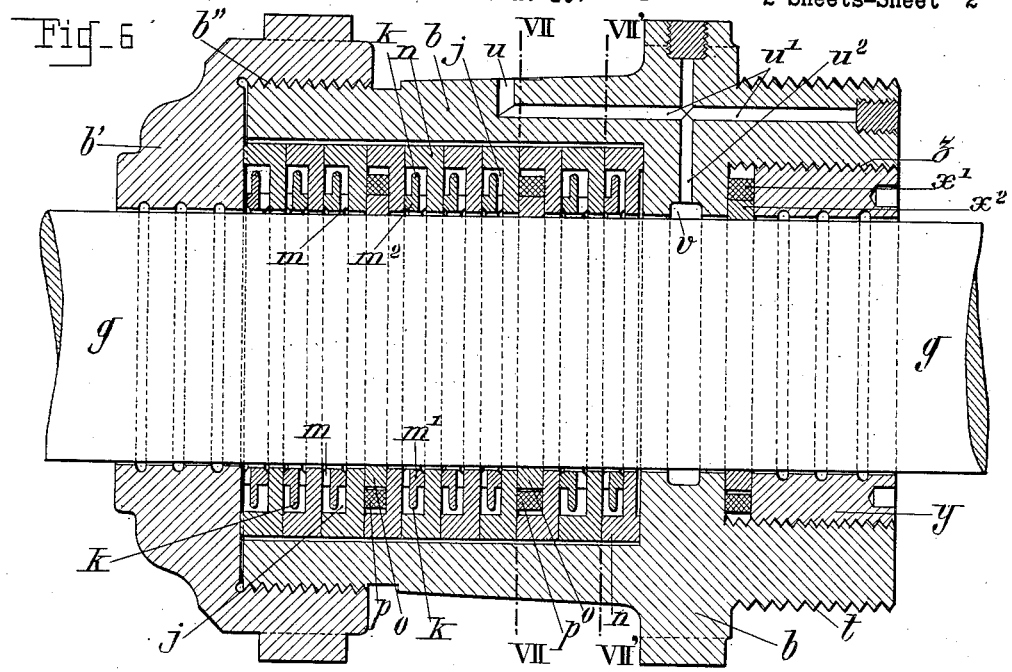
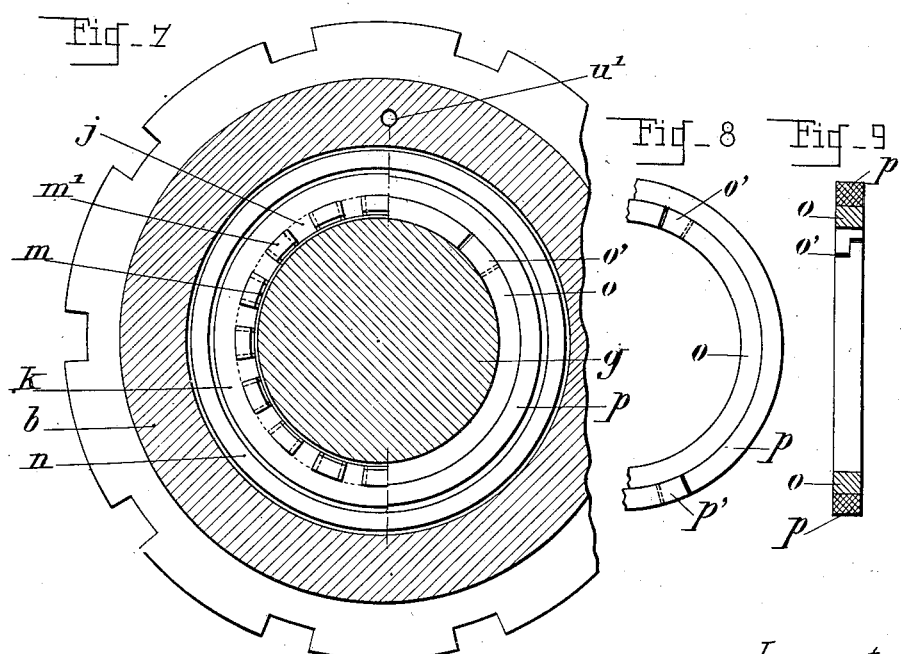

Patented Feb. 18, 1930

1,747,253

UNITED STATES PATENT OFFICE

JULES LEROY, OF LA GARENNE-COLOMBES, FRANCE

STUFFING BOX

Application filed June 16, 1921, Serial No. 478,060, and in France June 20, 1920.

The present invention relates to a packing for all types of shafts but particularly suitable for those to which an alternate rectilinear, that is reciprocating, movement is imparted, for example as in piston rods, steam engine, locomotive or similar shafts.

For shafts which rotate but do not move longitudinally it is old to use packings comprising baffles between which the steam expands progressively, but these packings are not applicable to reciprocating shafts because a part of the elements forming the baffles is integral with the shaft, which hence cannot describe longitudinal movement.

The packing forming the subject of the present invention is characterized by the fact that it comprises a series of cups and in these cups discs provided with projections of special form, these various elements being contained in a housing but resting freely on the shaft and adapted to move freely in the lateral direction with the shaft without causing the elements to wedge against the walls of the housing.

On the other hand, the discs provided with spacers comprise grooves leading to the expansion spaces so as to avoid formation of gas veins without a certain pressure between the elements of the packing shaft.

The improved gas-tight stuffing box forming the object of the present invention is of the kind of the stuffing box specified in my pending application No. 395,338 filed July 10, 1920, now Patent Number 1,514,057, issued Nov. 4, 1924, and has for its purpose to ensure at the point where the piston rod traverses the stuffing box, a very effective junction in order to prevent leakages.

The object of the invention is illustrated in the accompanying drawing as follows:

Fig. 6 shows an elevation and longitudinal section of a modification of the construction in question.

Fig. 7 shows two sectional views made on the lines VII—VII and VII'—VII' of Fig. 6.

Fig. 8 shows an elevation with a piece broken off of one of the elements of the apparatus illustrated in Fig. 6.

Fig. 9 shows a sectional view corresponding to Fig. 8.

Figure 1:
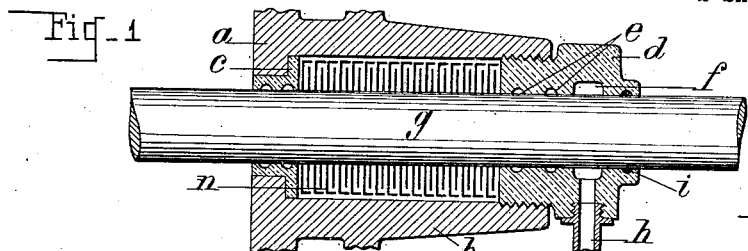
Fig. 1 shows a sectional elevation of one of the constructions of the improved system according to the present specification.
Figure 2:
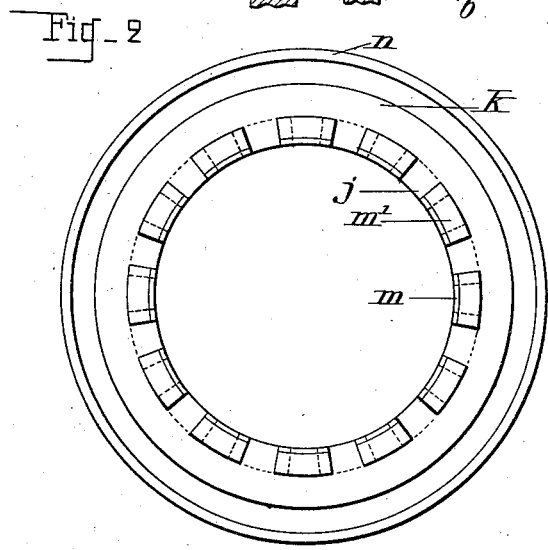
Fig. 2 shows a detail view in plan of one of the constituent elements of the system in question.
Figure 3:
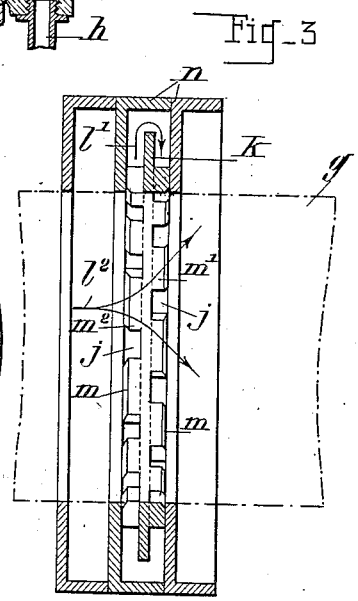
Fig. 3 shows a sectional elevation corresponding to Fig. 2.
Figure 4:
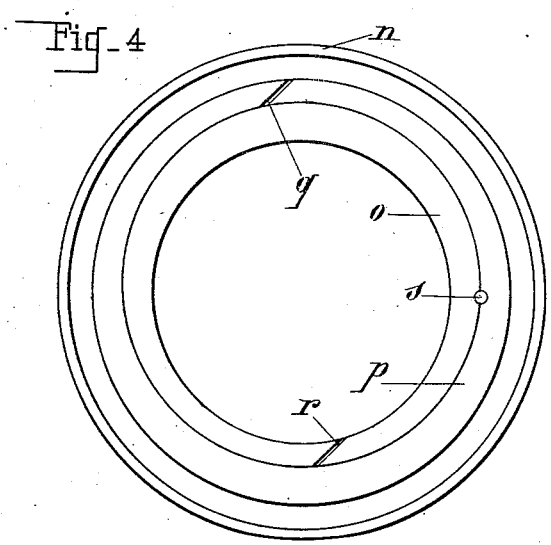
Fig. 4 shows a plan view of another element forming part of the present system.
Figure 5:
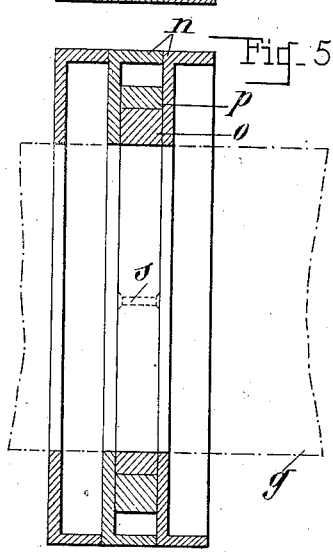
Fig. 5 shows a sectional element corresponding to Fig. 4.

Referring firstly to Figures 1 to 5 of the accompanying drawings:

These figures show in detail one of the constructions of the system improved according to the present invention. It will be seen that the bottom of the cylinder is prolonged by means of a box $b$ in which are placed the elements forming the gas-tight stuffing box, these elements being pressed, under the action of a screw plug $d$, against the part $c$ mounted upon the bottom of the cylinder in any convenient manner.

Supposing that in a certain case there is a leakage, or a condensation if it is a question of a steam engine; there has been provided upon the screw plug $d$ a series of little annular channels $e$ and a deeper channel $f$ forming a collecting receptacle and having for its object to collect any steam, condensed or otherwise, which may have been brought to it by the piston rod $g$. The steam or the water resulting from its condensation can then escape through the channel $h$ which communicates with a condenser or other suitable apparatus. One may also provide an asbestos washer $i$ placed close to the outer end of the screw plug $d$, the said washer having for its object to prevent the carrying forward of the lubricating oil or of the water of condensation when the rod $g$ is operating its to-and-fro motion.

Conformable to the construction above set forth, the discs or rings $k$ with apertures are formed in the following manner: In order to prevent any breach of continuity and to compel the steam, the air or the gas to pass by the apertures $j$ of the rings $k$ and to shape these rings in accordance with the arrow $l'$ in place of passing directly along the track of the arrow $l^2$, there is provided at the inner periphery of these rings the projecting parts $m^1$, $m^2$, forming baffles and supported alternately by the one and the other face of the rings $k$, and a circualr channel $m$ which has for its object to break the current of air, gas or steam which might pass between the baffles $n$, receiving the said rings and the rod $g$, thus forcing the gaseous fluid to pass through the apertures $j$ along the track indicated by the arrows $l^1$. The disks $k$, contained in the baffles $n$, are furnished on their two lateral faces with lugs $m^1$, $m^2$, spaced so as to have channels $j$ between them; the lugs $m^1$ of the one face, being placed opposite to the channels $j$ on the other face, and vice versa. The lugs $m^1$, $m^2$ are furnished with grooves $m$, which, together with the wall of the spindle $g$, and the wall of baffles $n$, form annular grooves, intercommunicating with the channels $j$, and communicating with the channels $j$, with the space between the disks and baffles, and the spindle $g$. Fluid, under some pressure, tends naturally to escape along the spindle $g$, between spindle $g$, and the metallic packing elements. Encountering, however, the channels $j$, or the annular grooves $m$, it escapes therethrough, and travels under constantly reducing pressure around the edge of disk $k$, as shown by arrow $l'$ in Fig. 3. Accordingly, the fluid, under pressure, which normally would pass along the spindle $g$, is led around successive disks $k$ which constantly reduces its pressure. The escaping fluid arriving, without pressure at the last baffle $n$ is unable to escape from the stuffing box. In the event that the rod $g$, instead of having a linear alternating movement, should receive a continuous circular movement (such as that of a turbine axle for instance), the segments $o$ and $p$ arranged in the interior of the baffles $n$ might have the tendency to turn along with the rod; they would then be displaced with respect to one another, because they are adjusted with slight friction in the baffles $n$, and may take such a position that their slots $q$ and $r$ would become coincident and thus give rise to a leakage. In order to prevent this drawback, a hole is cut on the contact line of the two segments, and there is placed in this hole a stud $s$ made of a metal softer than that of the baffles $n$ so as not to scratch these latter supposing that the stud should project from the segments.

It should further be observed that the external diameter of the baffles $n$ is slightly smaller than that of the container $b$, whereas the central aperture of these baffles provided for the passage of the rod $g$ is distinctly larger than the diameter of this rod, which permits of the latter taking its place without pressing against the baffles in the case in which the centering has not been perfectly correct. The height of the parts $m^1$ and $m^2$ of the rings $k$ is fixed so that these rings can be displaced with slight friction in the baffles $n$; the internal clearance of the segments $o$ and $p$ is fixed so as to obtain a slight friction on the rod $g$ when this latter has reached its maximum stroke, the width of these segments being moreover determined so that they can move with slight friction in the baffles $n$.

The number of the elements which form the gas-tight stuffing box is variable according to the pressure and the mode of operation of the engine, and the same applies to the intervals in the sequence of arrangement of the baffle rings, at which these elements including the double segments recur.

Finally, it should be remarked that the gastightness of the stuffing box is assured not by the contact between the baffles $n$ and the internal surface of the enclosure $b$ but by the contact of the baffles with one another.

In the modification shown in Figures 6 to 9 of the drawings the system of gas-tight stuffing always includes an enclosure $b$ in which are mounted the various elements which constitute the gas-tight stuffing box properly so called. These elements are likewise always formed of the baffle $n$ juxtaposed, and each having either a ring $k$ or two segments $o$ and $p$ pressing one upon another. The rings $k$ always show projecting parts $m^1$, $m^2$, arranged alternately upon one or the other of their faces so as to form baffles, and a circular channel $m$ having for its purpose to interrupt the current of air, gas or fluid which may pass between the baffle $n$ and the piston rod $g$, and which thus compels the aforesaid fluid to pass through the apertures $j$.

In the case of the modification in question, the totality of the elements of the stuffing box is held in position within the enclosure $b$ by means of the screw plug $b'$ which is screwed upon a correspondingly threaded part $b''$ placed for this purpose upon the end of the enclosure $b$ opposite the bottom of the cylinder. At its other end the aforesaid enclosure has a threading $t$ whereby it can be fixed upon the bottom of the cylinder, but such fixing might, of course, be effected in any other suitable manner.

The enclosure $b$ is provided with a grease duct $u^1$, $u^2$, which is supplied with lubricant at the point $u$, either by a greasing vessel or by an oil supply under pressure. The channel $u^2$ terminates in a circular channel $v$ which forms a reservoir for grease or oil all round the piston rod $g$.

On the other hand, in order to prevent the lubricating material from penetrating into the cylinder, the present improvement includes the double segment $x^1$, $x^2$, placed adjacent the channel $v$, and a ring $y$ which keeps it in place without obstructing it; the ring $y$ is fixed by means of a threading $z$ in the enclosure $b$ at the end of this latter which is fixed upon the cylinder.

Finally, the segments $o, p$ arranged in the interior of the enclosure $b$ in one or more baffles $n$ are so constructed as to offer at $o^1$ and $p^1$ points at which they are split, which arrangement prevents any breakage.

The elements of the packing such as the discs $k$ resting simply on the shaft and not being affixed thereto, this shaft may describe any longitudinal movement. On the other hand, the shaft may be moved slightly off axis (this being inevitable) without the members of the packing wedging against each other, by reason of the fact that the cups as well as the discs may move laterally in their housing and follow the movements of the shaft.

It is to be noted on the other hand that the circular channels $m$ provided in the spacers $m$, $m^2$ make it impossible for the liquid under pressure to escape between the shaft and the members forming the packing. It is known that packings formed of metallic baffle elements operated by successive expansion in spaces provided for this purpose permit the passage of small quantities of fluid; from baffle to baffle the pressure of this fluid decreases progressively until it is too weak to flow to the outside in the last baffles of the packing. In packings of the type above described it is possible that the fluid under pressure can flow without expanding following the path of the arrows $f^2$ (Fig. 6) between the shaft and the discs; this is prevented by the grooves $m$ which present an easier path for the escape of the fluid under pressure; the fluid is in fact passed thereby to the spaces $j$ comprised between the spacers or projections $n$, from which no escape in a direct line is possible; all fluid tending to pass out is progressively expanded and checked.

Having now particularly described and ascertained the nature of my said invention and in what manner the same is to be performed, I declare that what I claim is:—

A stuffing box for piston rods comprising in combination a casing adapted to surround a piston rod, a plurality of baffles having peripheral flanges, said baffles being arranged within said casing with the flange of each baffle making contact with the adjacent baffle forming chambers between said baffles, said baffles being provided centrally each with an aperture affording a free fit on the piston rod, means for pressing said baffles together in sealing relation at their contacting peripheral portions, and rings positioned in alternate chambers formed by said baffles, said rings being of smaller diameter than the radial dimensions of the chambers in which they are located and having lugs alternating with restricted passages, on their opposite sides, extending substantially to the lateral walls of the chambers in which they are located, said rings being also centrally apertured to afford a free fit on the piston rod, the unoccupied chambers serving as expansion chambers and the lugged rings affording tortuous passages between said expansion chambers, deviating from the direct longitudinal leakage path along said piston rod.

In testimony whereof I have signed my name to this specification.

JULES LEROY.